May 8, 1962 H. T. MARCY 3,033,460
COMPUTER APPARATUS FOR PROBLEMS WHEREIN A NUMBER OF VARIABLES ARE SUBJECT TO A LESSER NUMBER OF RESTRICTIONS
Filed Feb. 21, 1957
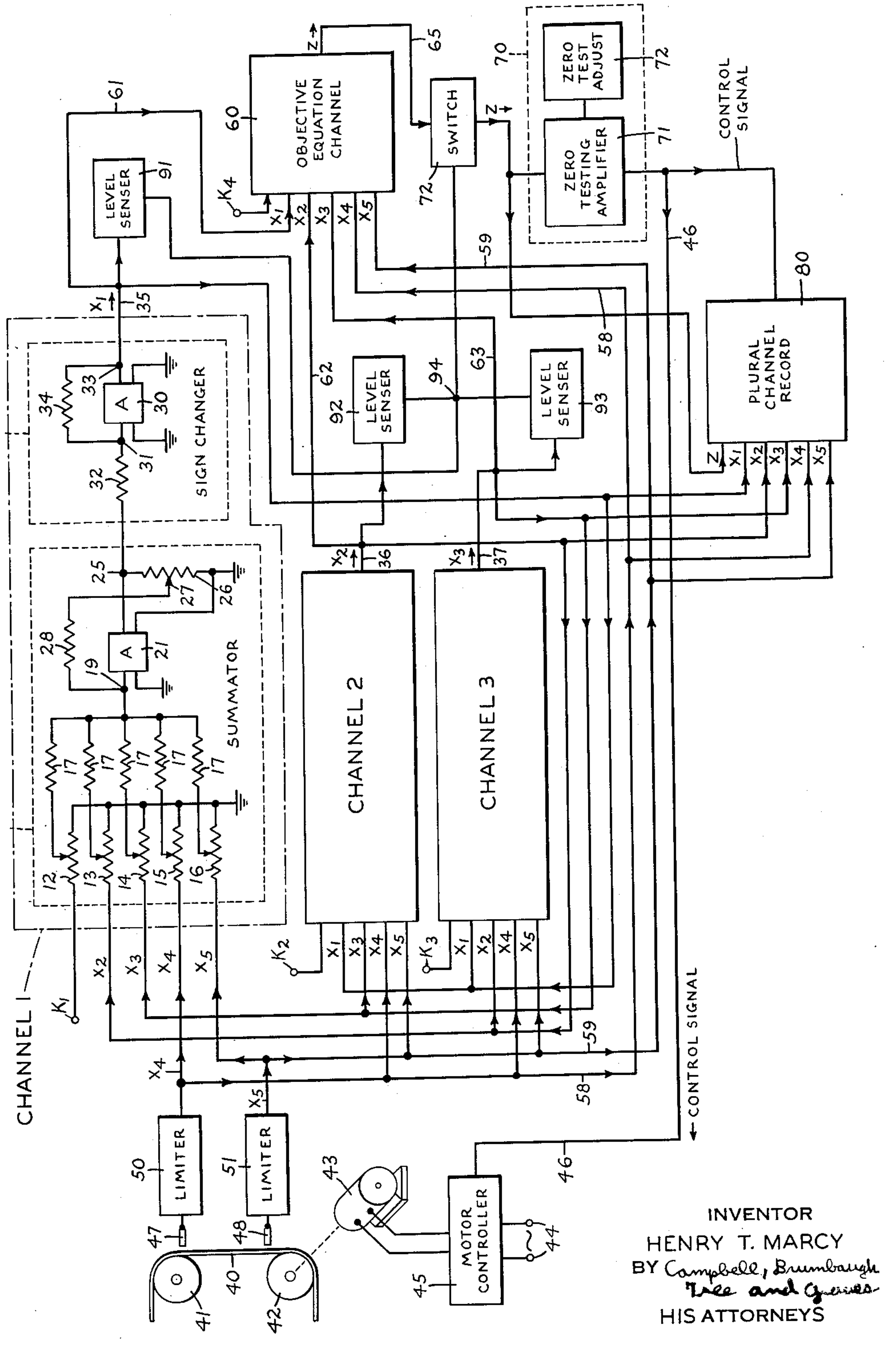
INVENTOR
HENRY T. MARCY
BY Campbell, Brumbaugh, Free and Graves
HIS ATTORNEYS

United States Patent Office 3,033,460
Patented May 8, 1962

3,033,460

COMPUTER APPARATUS FOR PROBLEMS WHEREIN A NUMBER OF VARIABLES ARE SUBJECT TO A LESSER NUMBER OF RESTRICTIONS

Henry T. Marcy, Scarsdale, N.Y., assignor to International Business Machines Corporation, New York, N.Y., a corporation of New York Filed Feb. 21, 1957, Ser. No. 641,520
18 Claims. (Cl. 235—180)

This invention relates generally to automatic computer apparatus, and more particularly to apparatus of this sort for dealing with problems which involve a plurality of variables subject to restrictions of lesser number than the number of variables.

As taught in United States Patent No. 2,595,185 to Zauderer et al. and in the article "Aanlysis of Problems in Dynamics by Electronic Circuits" by Ragazzini et al. (Proceedings of the I.R.E., vol. 35, No. 5, pp. 444–452, May 1947), computers have been developed to solve a problem of the type wherein *n* variables are restricted by *n* independent simultaneous equations. Computers which are limited in system organization to the form disclosed in these references are, however, incapable of dealing with the often-encountered type of problem wherein *n* variables are restricted by a lesser number *m* of independent simultaneous equations such that each of plural value sets of the *n* variables will satisfy the *m* equations, but wherein the said value sets differ among themselves in respect to their ability to realize a predetermined objective of the problem. Among problems which may fall into the category just discussed are those of minimax, linear programming, assignment, and linear regression.

Such problems and other "*n, m*" problems may arise within a number of fields of endeavor among which should be mentioned the field of management. In respect to this last-named field, many management problems as, say, scheduling production, proportioning transportation and allocating shipments, are of the "*n, m*" sort.

A simple example of such management problem is given in chapter XIII of "Activity Analysis of Production and Allocation" by Koopmans et al., published by John Wiley & Sons, 1951. Paraphrasing to a slight extent the problem under consideration which is set forth in this text, assume that a homogeneous product is to be shipped in the amounts $a_1, a_2 \ldots a_p$, respectively, from each of *p* shipping origins and received in amounts $b_1, b_2, \ldots b_q$, respectively, by each of *q* shipping destinations. The cost of shipping a unit amount from the *i*th origin to the *j*th destination is *cij*, and is known for all combinations (*i, j*). The problem is to determine the amounts *xij* to be shipped over all routes *i, j* so as to minimize the total cost of transportation.

This problem may be expressed in mathematical terms by a first set *p* of simultaneous equations, a second set *q* of simultaneous equations, and an additional equation which relates the variables of the problem to the objective thereof, namely minimization of the transportation cost. The *p* simultaneous equations, the *q* simultaneous equations, and the additional "objective" equation take the forms respectively indicated by Expressions 1, 2 and 3 set forth below.

$$\sum_{j=1}^{p} X_{ij} = a_i \qquad (1)$$

$$\sum_{i=1}^{q} X_{ij} = b_j \qquad (2)$$

$$\sum_{i=1}^{q} \sum_{j=1}^{p} C_{ij} X_{ij} = Z \qquad (3)$$

Inspection of the above expressions indicates that *pq* variables are involved in the $p+q$ simultaneous equations. Hence, in the ordinary case where one of the given factors *p, q* is equal to or greater than 2, and the other quantity is equal to or greater than 3, the considered problem is of the mentioned type wherein the variables exceed in number the simultaneous equations which impose restrictions on the variables.

It follows in the considered problem that there are a large number of value sets $(X_{11}, \ldots X_{ij}, \ldots X_{pq})$ which will each yield a different value for the function "Z" which quantifies the minimization factor and which is, hence, called the "objective function." These several values which are so obtainable for "Z" will, of course, realize this minimization objective in varying degree. Thus, the working out of the problem involves not only finding out which value sets of the variables of the problem will satisfy the simultaneous equations thereof, but, in addition, finding out which one or ones of these value sets best realize, according to the objective function, the objective of the problem. Of course, the problem may be carried forward in a series of steps wherein for a given step one of all the value sets examined in the step is selected as the value set which is tentatively the best for realizing the objective, this tentatively best value set is utilized as a guide to determine what other value sets might provide even better results, and these other value sets are examined in a succeeding step until the tentatively best of these other value sets has been found, and so on. In other words, progress towards the objective may be made by obtaining successive value sets which each represent an improvement over the preceding value set.

It is accordingly an object of the invention to provide computer apparatus adapted, when confronted with a problem involving *n* variables restricted by a lesser number *m* of simultaneous equations, to derive value sets of the variables which will satisfy the *m* equations and to indicate which one or ones of the derived value sets are at least tetatively best suited to realize an objective of the problem.

Another object of the invention is to provide computer apparatus of the sort described wherein the apparatus operates selectively to register a value set for later reference only when the said value set meets a predetermined standard of realization of the objective of the problem.

A further object of the invention is to provide computer apparatus of the sort described wherein the computer will be precluded from presenting hypothetical answers representing unworkable solutions to the problem in view of the practical limitations imposed thereon, but will instead present only answers which are consonant with these practical limitations.

These and other objects are realized according to the invention by providing a plurality of first electric signal channels which are each operable to simulate a corresponding one of the *m* simultaneous equations, at least one signal source which is at least partially independent in its operation of operational changes taking place in the first channels, and a second electric signal channel operable to simulate the objective equation. Each first channel is adapted to receive a representative signal for each but one of the variables of the equation corresponding to the channel, and to supply a first signal representing the leftover variable of the equation. The first channels are interconnected such that the respective first signal supplied by each first channel is received by each other first channel whose corresponding equation includes the variable represented by the last-mentioned first signal. In this manner, *m* out of the *n* of the variables of the problem will be represented by first signals from the first electric signal channels, while one or more of these $n$ variables will be left unrepresented by the said first signals.

For each variable so left unrepresented, there is a corresponding signal source. Each signal source develops a second signal which changes in value independently of the values of said first signals for at least a range of value changes of the latter signals, and which represents the variable associated with the source. Each such second signal is received by each first channel whose corresponding equation includes the variable represented by the last-named second signal. Each second signal when it changes in value affects the operation of the first channels to cause said channels to produce value changes in the first signals. In this manner, the computer develops plural sets of first and second signal values which, in a representational sense, correspond to value sets of the $n$ variables which will satisfy the $m$ equations.

The mentioned second electric signal channel simulates an objective equation which includes at least one of the variables represented by a first signal. The second channel is adapted by responding to each of the mentioned signals which represents a variable of the objective equation to provide an output signal equivalent to the objective function "Z." The changes in value of this output signal may be used to indicate the relative effectiveness with which the said $n$ variables will realize the objective of the problem as the $n$ variables are representationally changed in value by virtue of the value changes taking place in the first and second signals.

While it is feasible in accordance with the invention to attain the objects thereof by computers which fall within the category of digital differential analyzers or some other category, the particular form of computer which will be described herein is an analog computer which uses high gain D.C. operational amplifiers for at least some of its computing stages. Analog computers of the sort described can be designed to respond rapidly to changing inputs thereto, and this rapid response is desirable to permit the problem dealt with by the computer to be worked out in a relatively short period of time.

As a feature according to the invention, at least one source of a second signal may be a noise signal source such that random changes of value are produced in the second signal. It is also feasible, however, and, in fact, often desirable to use a signal source of such nature that the value changes of the second signal occur in some predetermined manner as, say, step by step or with continuous variation. When plural sources of second signals are used, the respective value changes of the second signals should occur in such relation to each other that a succession of different value permutations are provided by the second signals inter se.

As another feature of the invention, means may be provided either to keep the problem-solving operations of the computer apparatus within certain limitations imposed on the problem, or to disallow answers from the computer apparatus which fall outside these limitations. For example, the computer apparatus may, in connection with at least one second signal source, incorporate means which is either part of the source or interposed between the source and the first channels to restrict the second signal value changes received by the first channels to a predetermined range which includes those values and only those values which satisfy some limitation of the problem. As another example, the computer apparatus may, in connection with at least one of the mentioned first signals, incorporate means which operates when the first signal assumes a forbidden value (i.e., a value outside the range thereof which will satisfy some limitation of the problem) to disallow the answer then being offered by the computer apparatus. Such disallowance may be made either by indicating that the then presented answer is a spurious answer or by preventing any overt manifestation of the presented answer from being produced.

As yet another feature in accordance with the invention, the computer apparatus may incorporate register means to register for later reference the values manifested by the first and second signals and the values concurrently manifested by the second channel output signal. This register means may be either an indicator or a recorder. Preferably, there is utilized in conjunction with the register means a decision means which actuates the register means to register only when the decision means decides that the value then manifested by the second channel output signal represents a tentatively best realization of the objective of the problem. At the same time, the same or other decision means may be utilized to terminate the signal producing mode of operation previously characterizing at least one second signal source. Such control of the decision means over one or more of the second signal sources permits an appropriately designed computer apparatus to be manually or automatically adjusted to successive operation-determining settings which will cause the successive answers obtained to represent better and better realizations of the objective of the problem.

As stated, the problems to be dealt with according to the invention are problems wherein $n$ variables are restricted by a lesser number $m$ of simultaneous equations, and wherein an objective equation which is in addition to the $m$ equations relates at least one of the variables to a predetermined objective of the problem. While the invention is of use with problems where $n$ exceeds by only 1 the number $m$, in the usual case $n$ exceeds $m$ by 2 or more.

Each simultaneous equation of the problem may be expressed in a form wherein one side of the equation is constituted, in a generalized sense, of the sum of $n$ terms respectively corresponding to the $n$ variables of the problem, and of an additional term which is a constant. Still speaking in a generalized sense, each one of the $n$ terms includes a coefficient and the variable associated with the term. The coefficient may have either a positive or a negative value. Of course, the variable may also assume positive or negative values in dependence on what is required of the variable to satisfy the $m$ equations. In particular instances, the coefficient may have a value of 0 or 1. Usually, the coefficient is of constant value. On occasion, however, the coefficient may be changeable in value as when, say, the coefficient is itself a function of one or more variables of the problem. In some instances it may be required that, at times, the variable of a particular term assume the value 0.

For most problems, each of the simultaneous equations thereof is a first order equation. It is in accordance with the invention, however, for one or more of the equations to be other than first order as, for example, when in one of the terms of a particular equation the variable associated therewith is raised to some power which may be positive or negative and may be either greater or lesser than 1. Of course, however, the system of simultaneous equations of the problem must be of a type which can be dealt with by computer apparatus according to the invention in such manner that the computer apparatus is able to determine tentative ways of approaching the objective of the problem.

It will be obvious that the mentioned constant term may be either of positive or negative value, and may on occasion be equal to 0.

In many instances, the side of any particular simultaneous equation of the problem which includes the variable terms may be set equal to the value 0 appearing on the other side of the equation. In some instances, however, the problem as originally quantified does not require that the side of the equation which includes the variable terms be equal to 0, but instead merely requires, say, that this side be either equal to or greater than 0. When a situation of this sort arises, the matter of nonidentity between the two sides of the equation is taken care of by introducing a so-called "slack" variable into the side of the equation which includes the variable terms, and by assuming that the slack variable has the proper value to produce identity between the two sides of the equation. Thus, the equation takes on a form wherein the side of the equation which includes the variable terms is set equal to the value 0 on the other side of the equation, and wherein the slack variable is considered to be one of the $n$ variables of the problem.

It will be recalled that the problem includes in addition to the $m$ simultaneous equations an objective equation which relates one or more of the variables of the problem to an objective function "Z." The working out of the problem involves the determination of which one or ones of different value sets of the $n$ variables which satisfy the $m$ equations will, at least on a tentative basis, best permit the objective function "Z" to realize some predetermined optimum value therefor. In accordance with the nature of the problem, this optimum value for "Z" may be a minimum value, a maximum value, or some specified value for "Z" which is neither a minimum nor a maximum.

The mentioned objective equation may, in dependence on the considerations of the problem, assume a wide variety of forms. For example, the equation may express "Z" as a function of one or of a plurality of the variables of the problem, and the equation may be linear or nonlinear, of first order or some different order, and of zero degree. In practice, however, it is often found to be the case that the objective equation will assume the form of a linear first order, zero degree equation.

For a better understanding of the invention, reference is made to the following description of a detailed embodiment thereof, and to the accompanying drawing which shows the said embodiment partly in schematic diagram and partly in block diagram. In the description to follow, it will be understood that like elements will be designated by like reference numerals which, however, are mutually distinguished by different letter suffixes, and that a description of any one element is to be taken as the description of any other like element unless the context otherwise requires.

By way of introduction to the embodiment, assume, for simplicity of explanation, that the $n$, $m$ problem to be dealt with by the computer is one wherein $n=5$ and $m=3$. Assume, further, that the $m$ simultaneous equations and the objective equation of the problem can be respectively written in the forms shown below and designated (4), (5) and (6) for the simultaneous equations and (7) for the objective equation.

$$b_1x_2+c_1x_3+d_1x_4+e_1x_5+k_1=-a_1x_1 \quad (4)$$
$$a_2x_1+c_2x_3+d_2x_4+e_2x_5+k_2=-b_2x_2 \quad (5)$$
$$a_3x_1+b_3x_2+d_3x_4+e_3x_5+k_3=-c_3x_3 \quad (6)$$
$$a_4x_1+b_4x_2+c_4x_3+d_4x_4+e_4x_5+k_4=Z \quad (7)$$

In the above equations each of the quantities $a$–$e$ are constant value coefficients with coefficients $a_1$, $b_2$ and $c_3$ being of negative value and the remaining coefficients being of positive value. Each of the quantities $x_1$–$x_5$ is one of the five variables of the problem. The quantities $k_1$, $k_2$, $k_3$ and $k_4$ are constant terms of positive value. All of the coefficients $a$–$e$ and all of the constant terms $k_1$, $k_2$, $k_3$, $k_4$ are considered to have a value of less than 1. The quantity "Z" is the heretofore-mentioned objective function. The goal of the problem is to find a way to maximize "Z." The form in which Equations 4, 5 and 6 are written is in accordance with the instructions on page 448 of the mentioned I. R. E. article.

Referring now to the drawing, the block designated "Channel 1" is an electric signal channel adapted to act as the electric circuit analog of Equation 4. As shown, channel 1 comprises a summator stage 10 and a sign changer stage 11 connected in serial relation. Considering first the summator stage 10, this stage includes as an input means to channel 10 a network of adjustable potentiometers 12–16 whose taps are electrically connected through the unit value resistors 17 to a common junction 19. The junction 19 represents the input of a high gain D.C. amplifier 21. The amplifier 21 may have a gain, say, of $30\times10^6$, and a maximum output voltage of $\pm100$ volts whereby the voltage at input 19 necessary to establish this 100 volt value of output voltage is on the order of 3 microvolts. The frequency of response of the amplifier may be on the order of 100 cycles per second, and, preferably, should be of as high value as is practicable. The amplifier 21 is an inverting amplifier in the sense that its output voltage will be negative with respect to ground when its input voltage is positive with respect to ground, and, conversely.

The output from amplifier 21 appears on a junction 25. This junction is connected to ground through a resistor 26 having a sliding tap 27 thereon. The voltage appearing on tap 27 is fed back to the junction 19 through a feed-back path which includes a unit value resistor 28. By virtue of the fact that amplifier 21 is an inverting amplifier, the signal fed back through resistor 28 is a degenerative feed-back signal.

Considering now the sign-changing stage, this stage includes a high gain D.C. amplifier 30 which may have the same internal operating characteristics as the amplifier 21 in summator stage 10. The output at junction 25 of amplifier 21 is supplied to the input 31 of amplifier 30 through a resistor 32. Amplifier 30 produces an output voltage of which a portion is degeneratively fed back from junction 33 through a resistor 34 to the input 31 of the amplifier, and of which another portion is supplied to a lead 35 representing an output means for channel 1.

As taught in the mentioned patent to Zauderer et al. and in the mentioned I.R.E. article, the amplifiers 21 and 30 when connected as just described are adapted to act as "operational" amplifiers in the sense that these electric circuit devices will simulate various mathematical operations. To wit, amplifier 21 and its associated resistors will act to simulate the mathematical operation of summation in the following manner.

Assume, as is in fact the case, that the input voltages applied to the potentiometers 12–16 respectively represent the quantities $k_1$, $x_2$, $x_3$, $x_4$, $x_5$ appearing in Equation 4. Assume further, as is also the case, that the taps of potentiometers 12–16 are adjusted in accordance with the values of the quantities $k_1$, $b_1$, $c_1$, $d_1$ and $e_1$ of Equation 4 such that the said input voltages act through resistors 17 on junction 19 to respectively impress on this junction a number of "forward" superposed voltages which are respectively representative of the values of the terms $k_1$, $b_1x_2$, $c_1x_3$, $d_1x_4$ and $e_1x_5$ of the equation. It is evident that the sum of these forward voltages will be representative of the value of the left-hand side of Equation 4 as written.

Consider now the feed-back action of amplifier 21. The voltage on tap 27 acts through resistor 28 to impress on junction 19 a feed-back voltage which tends to balance out the sum of forward voltages impressed on this junction, but which will not effect a complete balancing-out since amplifier 21 must receive some input voltage in order to operate. In view, however, of the very high gain of amplifier 21, the incremental voltage, remaining at junction 19 after the forward voltages and the feed-back voltage have opposed each other, will be very near to zero value. For example, if as stated, amplifier 21 has a gain of $30\times10^6$ and an output voltage of 100 volts, the input voltage to the amplifier at junction 19 will be only about 3 microvolts or considerably less than one millionth part of the output voltage.

From what has been said it will be seen that, considering amplifier 21 as a simulator of mathematical addition, it can be assumed without significant error that the feed-back voltage on junction 19 exactly balances out with the sum of forward voltages on this junction to bring to zero value the net voltage to ground of this junction. Utilizing this assumption as a starting point, it follows from Equation 4 that the feed-back voltage on junction 19 must represent in value the quantity $a_1x_1$ to the same scale as the forward voltages on the said junction represent the quantities $k_1$, $b_1x_2$, $c_1x_3$, $d_1x_4$ and $e_1x_5$. This is so since in Equation 4 the quantity $a_1x_1$ must be added to both sides of the equation in order to render the left-hand side of the equation equal to zero. If, however, the feed-back voltage at junction 19 represents $a_1x_1$ to the same scale as the forward voltages on this junction represent $k_1$, $b_1x_2$, $c_1x_3$, $d_1x_4$, $e_1x_5$, then the voltage on tap 27 must represent $a_1x_1$ to the same scale as the input voltages to potentiometers 12–16 represent $k_1$, $x_1$, $x_2$, $x_3$, $x_4$, $x_5$ since resistors 17 and resistor 28, being all of the same value (i.e., unity value), will effect the same scale conversion between the feed-back voltage on junction 19 and the voltage on tap 27 as the scale conversion between the forward voltages on junction 19 and the input voltages to potentiometers 12–16.

If the voltage on tap 27 represents $a_1x_1$, tap 27 can be adjusted, as is done, to produce at junction 25 a voltage whose magnitude is representative of the magnitude of the variable $x_1$. Such adjustment is made by setting tap 27 on potentiometer 26 so that the ratio between the resistances to ground (through the potentiometer 26) of tap 27 and of junction 25 is equal in magnitude to the magnitude of the coefficient $a_1$.

There remains to be considered the matter of sign. The quantities $k_1$, $b_1x_2$, $c_1x_3$, $d_1x_4$, $e_1x_5$ are given in the equation as positive or negative value quantities and these quantities are represented by corresponding forward voltages of positive or negative value at junction 19. Considering, however, that $x_1$ is a positive value variable, that the quantity $a_1x_1$ is a negative quantity, but that the aggregate of the aforementioned voltages is positive at junction 19, this negative quantity $a_1x_1$ must be represented by a negative value feed-back voltage at junction 19 in order for cancellation to take place between the forward voltages and the feed-back voltages at the said junction. Considering quantity $a_1x_1$ from the viewpoint provided by Equation 4, the negativeness of this quantity arises out of given conditions of the equation that $a_1$ is a coefficient of negative value and $x_1$ is a variable of positive value whereby the product of $a_1$ and $x_1$ is negative in value. Considering quantity $a_1x_1$ from the viewpoint of the operation of amplifier 21, however, the negativeness of quantity $a_1x_1$ arises out of the fact that $a_1$ is represented by a resistive ratio of positive value, but that, due to the inverting action of amplifier 21, $x_1$ is represented by a negative value voltage at junction 25 whereby $a_1x_1$ will be represented at tap 27 by a voltage of negative value consonant with the negativeness of $a_1x_1$. At the same time, it is anomalous for $x_1$ to be represented at junction 25 by a negative value voltage since this variable should properly be represented by a positive value voltage in the view that, as hitherto stated, the variable $x_1$ is a positive value variable. To remedy this anomaly, therefore, the voltage signal at junction 25 is passed through the sign-changing amplifier 30 which has an inverting action but no scale-changing action whereby the output signal on lead 35 properly represents the variable $x_1$ by a positive value voltage.

To summarize the above, channel 1 operates as the electric circuit analog of Equation 4 in the sense that the channel responds to input voltages representative of the constant term $k_1$ and of the variables $x_2$, $x_3$, $x_4$, $x_5$ of the equation to provide an output voltage representative of the variable $x_1$ of the equation.

Channels 2 and 3 act in like manner as the electric circuit analogs of Equations 5 and 6. Thus, channel 2 responds to inputs representative of the quantities $k_2$, $x_1$, $x_3$, $x_4$, $x_5$ of Equation 5 to produce on a lead 36 an output voltage representative of the value of the quantity $x_2$ in this equation. Also, channel 3 responds to inputs representing the quantities $k_3$, $x_1$, $x_2$, $x_4$, $x_5$ of Equation 6 to produce on lead 37 an output voltage representative in value of the quantity $x_3$ in this last-named equation.

Channels 1, 2 and 3 are interconnected by suitable means in such manner that the output $x_1$ of channel 1 is supplied as an input $x_1$ to both of channels 2 and 3, the output $x_2$ of channel 2 is fed back as an input $x_2$ to both of channels 1 and 3, and the output $x_3$ of channel 3 is fed back as an input $x_3$ to both of channels 1 and 2. Thus, of the five variables involved in the problem, three of the input variables, namely, $x_1$, $x_2$ and $x_3$ are supplied as inputs to channels 1, 2, 3 from the channels themselves.

Voltages representing the remaining two variables $x_4$ and $x_5$ are derived in the following manner. A magnetic tape 40 having a noise signal recorded thereon passes over an idler roll 41 and over a drive roll 42. Roll 42 may be rotated by a motor 43 connected to power lines 44 through a conventional motor controller 45 which normally connects the motor to the power lines, but which is operable in response to a control signal on lead 46 to disconnect the motor. As motor 43 rotates roll 42 to drive tape 40, a length of the tape is drawn past a pair of spaced magnetic pickup heads 47 and 48. Each head will translate the recorded noise signal detected thereby on tape 40 into an electric voltage signal having random variations in amplitude. The electric signal so produced by pickup 47 represents the variable $x_4$, while the electric signal so produced by pickup 48 represents the variable $x_5$. Since both the $x_4$ signal and the $x_5$ signal are random amplitude signals, it will be seen that in the course of time the respective amplitude changes of the two signals will occur in such relation to each other that a large number of different amplitude permutations will be provided by the $x_4$ and $x_5$ signals.

It is evident that the problem to be dealt with by the disclosed embodiment may impose on the values of the $x_4$ and $x_5$ signals some limitation which is extrinsic in the sense that it is not indicated by Equations 4—6, but which, nonetheless, is significant in that the values $x_4$ and $x_5$ must be kept within a range dictated by this limitation if a workable answer is to be provided for the factual situation with which the problem is concerned. Thus, to assure that the disclosed embodiment will not present answers which hypothetically satisfy Equations 4, 5, 6 but which are not practical answers to the problem, but will, instead, present only practical answers, it is desirable that the $x_4$ and $x_5$ signals as received by channels 1, 2, 3 be each restricted to a range of value variation permitted by the mentioned limitation. This is done by interposing a limiter circuit 50 between pickup head 47 and the channels, and by interposing another limiter circuit 51 between pickup 48 and the channels. Each of the limiters 50 and 51 may be a simple limiter circuit of the conventional sort wherein the limiter prevents amplitude variations in its output signal from exceeding a preselected maximum value, and wherein this preselected maximum value is adjustable in a manual or in an automatic manner. If found desirable, however, one or both of limiters 50, 51 may be of such nature as to establish both a maximum and a minimum value for the output signal of the limiter considered, and may further be of such nature as to permit manual or automatic adjustment of the minimum and maximum value. While in the present instance the limiters 50 and 51 are designed to limit signals which are positive to ground, it is evident that, when the problem so requires, one or both of these limiters may be adapted to limit signals which are negative to ground.

The $x_4$ signal at the output of limiter 50 is supplied as an input to each of channels 1, 2 and 3. Similarly, the $x_5$ signal at the output of limiter 51 is supplied as an input to each of these three channels. As the $x_4$ and $x_5$ signals vary to form different amplitude permutations in succession among themselves, the channels 1, 2 and 3 will respond to each such different amplitude permutation to produce a different set of values for the $x_1$, $x_2$ and $x_3$ signals. Taking together at any instant the respective values assumed by the $x_4$ and $x_5$ signals and the respective values simultaneously manifested by the $x_1$, $x_2$ and $x_3$ signals, each such set of values for the signals $x_1$, $x_2$, $x_3$, $x_4$, $x_5$ represents a solution for the simultaneous Equations 4, 5, 6. Since each amplitude permutation of the $x_4$ and $x_5$ signals thus generates a different value set $(x_1, \ldots x_5)$ of signals representing a solution for the simultaneous equations, and since the $x_4$ and $x_5$ signals are continuously forming different amplitude permutations amongst themselves, the result will be that the $x_4$ and $x_5$ signal variations will, over a period of time, generate in continuous succession a large number of $(x_1, \ldots x_5)$ sets of signal values which are all representative of solutions to the mentioned equations. Moreover, if the time period is long enough, there will be included, within the whole succession of sets of signal values generated over this time period, substantially all of the sets of signal values which can possibly represent equation solutions satisfying the limitations imposed by limiters 50 and 51.

In connection with the foregoing, the $x_4$ and $x_5$ signals may be considered to represent "undetermined" variables since these signals vary in value independently of the values assumed by the $x_1$, $x_2$ and $x_3$ signals. Conversely, the $x_1$, $x_2$ and $x_3$ signals may be considered to represent "determined" variables since the values assumed by the $x_1$, $x_2$ and $x_3$ signals depend upon the values of $x_4$ and $x_5$ input signals to channels 1, 2 and 3. In setting up the problem on the computer it is largely a matter of free choice as to which of the $n$ variables of the problem are selected to be the undetermined variables of the computer, and which of these $n$ variables are selected to be the determined variables of the computer. As one condition, however, not all of the variables which appear in the objective equation can be selected to be undetermined variables of the computer.

In order to determine the relative degree to which the different solutions so provided by the computer will realize the objective of the problem, the $x_4$ and $x_5$ signals are fed by respective leads 58 and 59 to a channel 60 designated as the "objective equation" channel, and the $x_1$, $x_2$, $x_3$ signals on leads 35, 36, 37 are also fed by leads 61, 62, 63 to this channel. The channel 60 is analogous in circuit arrangement to the detailed circuit arrangement shown for channel 1. Thus, channel 60 includes a summator amplifier, and this summation amplifier may be followed by a sign changing amplifier which corrects for the signal inverting effect of the summation amplifier. As shown in the figure, the summation amplifier of channel 60 receives input voltages corresponding to the quantities $k_4$, $x_1$, $x_2$, $x_3$, $x_4$ and $x_5$ appearing in the left-hand side of Equation 7. These six inputs are supplied to the summation amplifier through six adjustable potentiometers analogous to the potentiometers 12–16 of channel 1. The six potentiometers are adjusted in the manner already taught for channel 1 so that the signals which are added by the summation amplifier of channel 60 will be signals which respectively represent in value the terms $a_4x_1$, $b_4x_2$, $c_4x_3$, $d_4x_4$, $e_4x_5$ and $k_4$ of Equation 7. The adding action of the summation amplifier and the subsequent sign changing action of the sign changing amplifier of channel 60 will result in the production on an output lead 65 for this channel of a signal whose amplitude is representative in value of the objective function "Z" of Equation 7.

As will be evident from the foregoing discussion, the continuous succession of different $(x_1, \ldots x_5)$ sets of signal values which are supplied to channel 60 will cause this channel to produce continuous changes in value in the "Z" signal. In the course of such operation of channel 60, the various amplitudes assumed by the "Z" signal represent, in accordance with their value, the relative degree to which the objective of the problem will be realized by the various $(x_1, \ldots x_5)$ solutions of the simultaneous equations whose electric signal analogs are supplied to channel 60 to produce these various amplitudes of the "Z" signal. Thus, in the present instance, where the objective of the problem is to maximize "Z," a sudden amplitude peak appearing in the "Z" signal will indicate that the solution then being offered by the computer represents a substantially more satisfactory answer to the problem than the solutions previously offered thereby. It follows that any $(x_1, \ldots x_5)$ value set which produces a substantially greater amplitude in the "Z" signal than those previously attained should be noted for future reference as representing the best answer to the problem that has so far been attained.

The search for the tentatively best solution to the problem could, of course, be carried out by continuously recording in separate recording channels the values of the variable input signals to channel 60, by recording in another recording channel the simultaneous variations in value of the "Z" signal, by inspecting the record so obtained to determine the maximum value obtained in the record for the "Z" signal, and by reading off the values of the variable input signals to channel 60 which correspond to this maximum value for the "Z" signal. Such procedure would, however, be tedious in the extreme.

In order to avoid such tedium, the present embodiment includes a decision means represented in the drawing by the block 70 of dotted outline. As shown, the decision means comprises a zero testing amplifier 71 and a zero test adjusting device 72. The zero testing amplifier 71 may be in the form of a two-stage D.C. amplifier, while the zero test adjusting device 72 may be in the form of an adjustable potentiometer connected to amplifier 71 to control the grid bias voltage of the first stage of the amplifier in accordance with the setting of the potentiometer. The "Z" signal on lead 65 is supplied to the input of amplifier 71 by passage of the "Z" signal through a switch device 72 whose function will be later described.

Considering the operation of block 70, the "zero test adjust" device 72 is preliminarily adjusted to reduce to below cut-off the grid bias voltage of the first stage of amplifier 71. The amount by which this bias voltage is reduced below cut-off is made equal in magnitude to a value of the "Z" signal representing a selected standard of realization of the objective of the problem. Next, the computer is operated and the "Z" signal is received at the input of amplifier 71. This "Z" signal as applied to the amplifier, is of a positive value and, hence, opposes the negative grid biasing voltage impressed on the first stage of the amplifier from device 72. Thus, if at any time the "Z" signal exceeds in value the amount by which the said first stage has been biased below cut-off, the first stage of amplifier 71 will become conducive to thereby cause a positive "control" signal to appear at the output of amplifier 71. The appearance of this control signal indicates that the particular set of $(x_1, \ldots x_5)$ values then being generated by the computer is a set of values which not only satisfies Equations 4, 5 and 6, but in addition satisfies the selected standard of realization of the problem which has been set into the computer by the "zero test adjust" device 72.

The control signal from amplifier 71 is utilized in the following ways. First, the control signal is supplied by a lead 79 to actuate a normally inactive plural channel recorder 80. This recorder has six inputs which are respectively connected to receive the "Z" signal and the five computer signals which represent the variables $x_1$, $x_2$, $x_3$, $x_4$ and $x_5$. The recorder 80 is adapted, when actuated, to record in separate recording channels the amplitudes which are being manifested by its six input signals at the time of actuation of the recorder. Accordingly, the recorder 80 will record for later reference the solution offered by the computer as a solution which meets the predetermined standard required for solutions. At the same time, since the recorder 80 is only selectively actuated, a laborious inspection of the record is avoided.

Second, the control signal from amplifier 71 is supplied by way of lead 46 to the motor controller 45. The said motor controller responds to the control signal to terminate the flow of power from terminals 44 to motor 43. When motor 43 is thus de-energized, the motion of tape 40 is arrested to thereby put an end, for the time being, to the supplying of $x_4$ and $x_5$ signals to the channels 1, 2 and 3. When the supply of $x_4$ and $x_5$ signals is so terminated, the computer will no longer generate solutions for the simultaneous Equations 4, 5, 6. This period when the computer is at rest may be taken advantage of to reset the computer so that the computer will explore for the tentatively best solution in a new region of solutions which promises the possibility of providing an even better solution than that hitherto obtained. The bounds of this new region may be indicated by the recorded values of the $(x_1, \ldots x_5)$ value set which has just been recorded.

As stated in connection with the $x_4$ and $x_5$ signals, there may be some practical extrinsic limitation or limitations imposed on the problem dealt with by the computer whereby, in order to provide a working answer to the problem, the ranges of values assumed by the $x_4$ and $x_5$ signals must be restricted in accordance with the limitation or limitations of the problem. Much the same situation may exist in regard to one or more of the $x_1$, $x_2$ and $x_3$ signals. To wit, some extrinsic limitation of the problem may establish that all values of the $x_1$ signal outside a given range thereof are "forbidden" values. Similarly, it may be the case that there are only restricted ranges of allowed values for the $x_2$ and $x_3$ signals, all values of the last-named signals outside these ranges being forbidden values.

The matter of allowed and forbidden values for the $x_1$, $x_2$ and $x_3$ signals is taken care of by the presently-shown embodiment, not by limiting the amplitude excursions of the signal to their allowed values as is done in the case of the $x_4$ and $x_5$ signals, but, instead, by the technique of sensing when the level of any one of the $x_1$, $x_2$ and $x_3$ signals exceeds its range of allowed values, and by disallowing the solution presented by the computer whenever a range of allowed values is so exceeded. The technique just described is operationally incorporated in the shown embodiment by a disallower means comprised of a plurality of level sensers 91, 92, 93 and of the heretofore mentioned switch circuit 72.

The three level senser circuits 91, 92, 93 are respectively connected to receive the $x_1$, $x_2$ and $x_3$ signals from the outputs of channels 1, 2 and 3. Each level senser circuit may resemble the zero testing amplifier 71 in that the level senser circuit is a D.C. amplifier adapted to provide an output signal only when its input signal exceeds a predetermined level whose value is adjustable in a manual or automatic manner. The outputs of the three level sensing circuits are tied to a common junction 94 so that if any one such circuit produces an output signal, this output signal will appear at the junction. The junction 94, in turn, is connected to the switch device 72. Ordinarily, the switch device 72 permits conduction of the "Z" signal from the output of channel 60 to the input of the zero testing amplifier 71. When, however, a signal appears on junction 94, this signal causes switch device 72 to open to thereby interrupt momentarily the flow of the "Z" signal to the zero testing amplifier. In this manner the computer is prevented from registering on the plural channel recorder 80 any solution to the problem which would include a forbidden value for any one of the $x_1$, $x_2$ and $x_3$ signals.

Of course, other means may be provided for disallowance of particular solutions generated by the computer. For example, as an alternative to the level senser circuits 91, 92, 93 and switch 72 the $x_1$, $x_2$ and $x_3$ signals from channels 1, 2, 3 may be respectively passed through a plurality of adjustable limiter circuits before being fed back to the inputs of the channels 1, 2 and 3. If such limiter circuits are used, and if any one of the last-named signals presents at the input to its limiter a value exceeding the maximum value which will be passed by the limiter (and which thus represents the maximum allowable value for the variable corresponding to the signal), the output signal from the limiter will have a value which is inappropriate to establish the normal condition of "zero" net voltage at, say, the junction 19 of channel 1 or at, say, the corresponding junction of one or both of channels 2 and 3. This absence of "zero" net voltage can be detected and translated into an indication that the solution then being offered by the computer should be disallowed.

The embodiment described above being exemplary only, it will be understood that the present invention comprehends embodiments differing in form and/or detail from the above-described embodiment. For example, when the same variable appears in a positive value term in one or more simultaneous equations, and this variable appears in a negative value term in the remaining simultaneous equations, appropriate sign changing devices may be incorporated into the computer to provide the proper sign for each such term. Also, a computer according to the invention may be adapted for use with simultaneous equations wherein some or all of the coefficients are greater than 1 by incorporating suitable scale changing operational amplifiers in the computer. Further, suitable time delay devices may be incorporated in the computer to establish desired timing relations therein. Accordingly, the invention is not to be considered as limited save as is consonant with the scope of the following claims.

I claim:

1. Computer apparatus for a problem wherein $n$ variables are restricted by a lesser number $m$ of simultaneous equations and wherein different values of said $n$ variables which satisfy said equations are adapted to realize an objective of said problem in varying degree, said apparatus comprising, a plurality of first electric signal channels each having input means, output means, and each being operable to simulate a corresponding one of said $m$ equations, said first channels being interconnected to provide a corresponding plurality of signals which represent $m$ of said $n$ variables and which are both inputs to and outputs from said channels, and each first channel being connected to receive as inputs those ones of said signals which represent each but one of the variables of the equation simulated by that channel, a respective source of a dynamically varying signal for each one of the remaining $n—m$ of said $n$ variables, each source providing a representation by its signal of the associated variable whereby all of said $n$ variables are represented by signals, and each such source being independent in operation of said signals representing said $m$ variables, but being connected to drive said first channels by the signal from the last named source whereby all said signals dynamically change in value to represent successive different solutions in terms of said $n$ variables for said $m$ equations, and a second electric signal channel operable to simulate an equation wherein a quantity Z is a function of at least one of said $m$ variables and wherein the value of Z is a measure of the degree of realization of said objective, said second channel being responsive to each signal representing a particular one of those $n$ variables of which Z is a function to produce a variable value output signal which represents Z and which indicates the degree to which different ones of said solutions will realize said objective.

2. Computer apparatus for a problem wherein $n$ variables are restricted by a lesser number $m$ of simultaneous equations and wherein different values of said $n$ variables which satisfy said $m$ equations are adapted to realize an objective of said problem in varying degree, said apparatus comprising, a plurality of first electric signal channels, each having input means, output means, and each being operable to simulate a corresponding one of said

*m* equations, each first channel being connected to receive at its input means a representative signal for each but one of the variables of the corresponding equation, and to provide at its output means a first signal which represents said one variable, said first signals representing *m* of said *n* variables, means interconnecting said first channels to feed back said first signal of each first channel to the input means of each other first channel whose corresponding equation includes the variable represented by said last-named first signal, a respective signal source corresponding to each one of the remaining $n-m$ of said *m* variables, each such source being adapted to provide a second signal which dynamically varies in value independently of the values of said first signals and which represents the variable associated with the said source whereby all of said *n* variables are represented by signals, means to supply each such second signal to the input means of each first channel whose corresponding equation includes the variable represented by the last-named second signal, each such second signal driving said first channels whereby all said signals dynamically change in value to represent successive different solutions in terms of said *n* variables from said *m* equations, and a second electric signal channel operable to simulate an equation wherein a quantity Z is a function of at least one of said *m* variables and wherein the value of Z is a measure of the degree of realization of said objective, said second channel being responsive to each signal representing a particular one of those *n* variables of which Z is a function to produce a variable value output signal which represents Z and which indicates the degree to which different ones of said solutions will realize said objective.

3. Computer apparatus as in claim 2 wherein at least one second signal is derived from a random signal source.

4. Computer apparatus as in claim 2 further comprising means to limit the changes in value of at least one second signal to a predetermined range of values.

5. Computer apparatus as in claim 2 comprising means connected to register values manifested by said first and second signals and the value concurrently manifested by said second channel output signal.

6. Computer apparatus as in claim 5 further comprising decision means adapted by responding to said second channel output signal when of a value representing a tentatively best realization of said objective to initiate the registering action of said register means.

7. Computer apparatus as in claim 2 further comprising disallower means responsive to at least one second signal when of a forbidden value to nullify the indication provided by said second channel output signal.

8. Computer apparatus as in claim 2 further comprising decision means adapted by responding to said second channel output signal when of a value representing a tentatively best realization of said objective to terminate the signal-producing mode of operation previously characterizing at least one second signal source.

9. Computer apparatus for problems wherein *n* variables are restricted by *m* simultaneous equations less in number by at least two than said *n* variables, and wherein different values of said *n* variables which satisfy said *m* equations are adapted to realize an objective of said problem in varying degree, said apparatus comprising, a plurality of first electric signal channels each having input means, output means, and each being operable as the electric circuit analog of a corresponding one of said *m* equations, each first channel being connected to receive at its input means a respective analog signal for each but one of the variables of the corresponding equation, and to provide at its output means a first signal as the analog signal of said one variable, said first signals being respective analogs of *m* of said *n* variables, means interconnecting said first channels to feed back said first signal of each first channel to the input means of each other first channel whose corresponding equation includes the variable represented by said last-named first signal, a plurality of signal sources respectively corresponding to the remaining $n-m$ of said *n* variables, and respectively providing a plurality of dynamically varying second signals as analog signals for the variables associated therewith whereby all said *n* variables are represented by signals, said second signals changing in amplitude relative to each other and independently of said first signals such that amplitude permutations are generated by said second signals inter se, means to supply each such second signal to the input means of each first channel whose corresponding equation includes the variable represented by the last-named second signal, said second signals driving said first channels whereby all said signals dynamically change in amplitude to represent successive different solutions in terms of said *n* variables for said *m* equations, and a second electric signal channel operable as the electric circuit analog of an equation wherein a quantity Z is a function of at least one of said *m* variables and at least one of said $n-m$ variables and wherein the value of Z is a measure of the degree of realization of said objective, said second channel being responsive to each signal representing a particular one of those *n* variables of which Z is a function to produce a variable amplitude output signal which represents Z by the amplitude of the signal and which indicates by the amplitude of the signal the degree to which different ones of said solutions will realize said objective.

10. Computer apparatus as in claim 9 further comprising means adapted when actuated to register the amplitude then manifested by said second channel output signal and the amplitude then manifested by each of said first and second signals, and decision means adapted responsive to attainment by said second channel output signal of an amplitude value indicating a tentatively best approximation to said objective to actuate said register means.

11. Computer apparatus as in claim 10 wherein said decision means is further adapted to modify the signal producing action of each of said second signal sources.

12. Computer apparatus as in claim 10 further comprising means to limit the change in amplitude of each of said second signals to a range of amplitude change which is predetermined for each such second signal, and means responsive to attainment by any one of said first signals of a forbidden amplitude value for that signal to disallow the indication then provided by said second channel output signal.

13. Computer apparatus as in claim 10 further comprising, means adapted when actuated to register the amplitude then manifested by said second channel output signal and the amplitude then manifested by each of said first and second signals, decision means responsive to attainment by said second channel output signal of an amplitude value indicating a tentatively best approximation to said objective to actuate said register means, and means responsive to attainment by any one of said first signals of a forbidden amplitude value for that signal to disable said decision means from actuating said register means during the continuance of said forbidden value.

14. Computer apparatus for problems wherein *n* variables are restricted by *m* simultaneous equations less in number by at least two than said *n* variables, and wherein different values of said *n* variables which satisfy said *m* equations are adapted to realize an objective of said problem in varying degree, said apparatus comprising, a plurality of first electric signal channels each having input means, output means, and high gain D.C. operational amplifiers including a summation amplifier and a following sign changing amplifier connected between said input means and output means, each first channel being operable as the electric circuit analog of a corresponding one of said equations, each first channel being connected to receive at its input means a respective analog signal for each but one of the variables of the corresponding equation, and to provide at its output means a first signal as the analog signal of said one variable, said first signals being respective analogs of $m$ of said $n$ variables, means interconnecting said first channels to feed back said first signal of each first channel to the input means of each other first channel whose corresponding equation includes the variable represented by said last-named first signal, a plurality of signal sources respectively corresponding to the remaining $n-m$ of said $n$ variables and respectively providing a plurality of dynamically varying second signals as analog signals for the variables associated therewith whereby all said $n$ variables are represented by signals, said second signals changing in amplitude relative to each other and independently of said first signals such that amplitude permutations are generated by said second signals inter se, means to supply each such second signal to the input means of each first channel whose corresponding equation includes the variable represented by the last-named second signal, said second signals driving said first channels whereby all said signals dynamically change in amplitude to represent successive different solutions in terms of said $n$ variables for said $m$ equations, and a second electric siganl channel including a high gain D.C. operational amplifier adapted to act as the electric circuit analog of an equation wherein a quantity Z is a function of at least one of said $m$ variables and at least one of said $n-m$ variables and wherein the value of Z is a measure of the degree of realization of said objective, said second channel being responsive to each signal representing a particular one of those $n$ variables of which Z is a function to produce a variable amplitude output signal which represents Z by the amplitude of the signal and which indicates by the amplitude of the signal the degree to which different ones of said solutions will realize said objective.

15. Computer apparatus as in claim 14 further comprising a plural channel recorder adapted when actuated to record in separate channels thereof the amplitude then manifested by each of said first and second signals and the amplitude then manifested by said second channel output signal, and a decision circuit adapted responsive to attainment by said second channel output signal of an amplitude value representing a tentatively best approximation to said objective to actuate said plural channel recorder.

16. Computer apparatus as in claim 15 wherein said decision means is further adapted to terminate the signal-producing mode of operation previously characterizing at least one of said second signal sources.

17. Computer apparatus as in claim 14 further comprising means to limit the change in amplitude of each of said second signals to a range of amplitude change which is predetermined for each such second signal, a respective level sensing circuit for each first signal, each level sensing circuit being responsive to attainment by its associated first signal of a forbidden amplitude value to produce a disallow signal, and means responsive to a disallow signal produced by any one of said level sensing circuits to nullify the indication provided by said second channel output signal.

18. Computer apparatus for problems wherein $n$ variables are restricted by $m$ simultaneous equations less in number by at least two than said $n$ variables, and wherein different values of said $n$ variables which satisfy said $m$ equations are adapted to realize an objective of said problem in varying degree, said apparatus comprising, a plurality of first electric signal channels each having input means, output means, and high gain D.C. operational amplifiers including a summation amplifier and a following sign changing amplifier connected between said input means and output means, each first channel being operable as the electric circuit analog of a corresponding one of said equations, each first channel being connected to receive at its input means a respective analog signal for each but one of the variables of the corresponding equation, and to provide at its output means a first signal as the analog signal of said one variable, said first signals being respective analogs of $m$ of said $n$ variables, means interconnecting said first channels to feed back said first signal of each first channel to the input means of each other first channel whose corresponding equation includes the variable represented by said last-named first signal, a plurality of signal sources respectively corresponding to the remaining $n-m$ of said $n$ variables and respectively providing a plurality of dynamically varying second signals as analog signals for the variables associated therewith whereby all said $n$ variables are represented by signals, said second signals changing in amplitude relative to each other and independently of said first signals such that amplitude permutations are generated by said second signals inter se, means to supply each such second signal to the input means of each first channel whose corresponding equation includes the variable represented by the last-named second signal, said second signals driving said first channels whereby all said signals dynamically change in amplitude to represent successive different solutions in terms of said $n$ variables for said $m$ equations, means to limit the change in amplitude of each of said second signals to a range of amplitude change which is predetermined for each such second signal, a second electric signal channel including a high gain D.C. operationa lamplifier adapted to act as the electric circuit analog of an equation wherein a quantity Z is a function of at least one of said $m$ variables and at least one of said $n-m$ variables and wherein the value of Z is a measure of the degree of realization of said objective, said second channel being responsive to each signal representing a particular one of those $n$ variables of which Z is a function to produce a variable amplitude output signal which represents Z by the amplitude of the signal and which indicates by the amplitude of the signal the degree to which different ones of said solutions will realize said objective, a plural channel recorder adapted when actuated to record in separate channels thereof the amplitude then manifested by each of said first and second signals and the amplitude then manifested by said second channel output signal, a decision circuit responsive to attainment by said second channel output signal of an amplitude value representing a tentatively best approximation to said objective to actuate said plural channel recorder, a respective level sensing circuit for each first signal, each level sensing circuit being responsive to attainment by its associated first circuit of a forbidden amplitude value to produce a disallow signal, and means responsive to a disallow signal produced by any one of said level sensing circuits to disconnect said second channel output signal from said decision circuit.

References Cited in the file of this patent

UNITED STATES PATENTS

| | | |
|---|---|---|
| 2,595,185 | Zauderer et al. | Apr. 29, 1952 |
| 2,805,823 | Raymond et al. | Sept. 10, 1957 |

OTHER REFERENCES

Review of Scientific Instruments (Adcock), pages 181–187; March 1948.

Trans. of AIEE (Payne), pages 139–143; March 1956.

Analog Methods in Computation and Simulation (Soroka), 1954; pages 120–126.